(12) United States Patent
McCoy et al.

(10) Patent No.: US 6,526,809 B2
(45) Date of Patent: Mar. 4, 2003

(54) METHOD FOR IDENTIFYING LEAKS IN A SEALED PACKAGE HAVING A LIQUID THEREIN

(75) Inventors: Christopher R. McCoy, Harrison, OH (US); Verne Rebsch, Cleves, OH (US); Brian Dean Brasier, Lawrenceburg, IN (US)

(73) Assignee: Cincinnati Test Systems, Inc., Cleves, OH (US)

( * ) Notice: Subject to any disclaimer, the term of this patent is extended or adjusted under 35 U.S.C. 154(b) by 44 days.

(21) Appl. No.: 09/821,300

(22) Filed: Mar. 29, 2001

(65) Prior Publication Data

US 2002/0000117 A1 Jan. 3, 2002

Related U.S. Application Data

(60) Provisional application No. 60/193,222, filed on Mar. 30, 2000.

(51) Int. Cl.[7] .............................. G01M 3/34; G01M 3/00
(52) U.S. Cl. ........................................ 73/49.3; 73/52
(58) Field of Search ....................... 73/49.2, 49.3, 73/49.4, 52

(56) References Cited

U.S. PATENT DOCUMENTS

| 5,239,859 A | 8/1993 | Lehmann | 73/49.2 |
| 5,907,093 A | 5/1999 | Lehmann | 73/49.3 |

*Primary Examiner*—Daniel S. Larkin
*Assistant Examiner*—Jay L Politzer
(74) *Attorney, Agent, or Firm*—Frost Brown Todd LLC

(57) ABSTRACT

An improved method for detecting leaks in a sealed package or container, where the contents of the container includes at least one liquid component, is disclosed. First the container to be tested is placed in a vacuum chamber which is in turn sealed. A vacuum is then applied to the vacuum chamber to lower the pressure, within the chamber, to a pressure that is below the vapor pressure of the liquid component in the container being tested. The vacuum source is then isolated from the chamber. The presence and severity of any package leak is detected by monitoring the increase of pressure in the vacuum chamber as a leak indicative signal whereby a relatively steady increase in pressure over time is indicative of "leaking" unrelated to the package under test and wherein relatively uneven increases of pressure, over time ,is indicative of boiling liquid and therefore a leak in at least one test specimen.

4 Claims, 4 Drawing Sheets

METHOD FOR IDENTIFYING LEAKS IN A SEALED PACKAGE HAVING A LIQUID THEREIN

RELATED APPLICATIONS

This application claims priority of Provisional Patent Application Serial No. 60/193,222 filed on Mar. 30, 2000, titled "Method For Identifying Leaks In Closed And Filled Containers."

TECHNICAL FIELD

This invention relates to a method for leak testing sealed containers and/or packages, particularly sealed packages containing at least one liquid component therein.

BACKGROUND OF THE INVENTION

Many manufactured items must be tested before shipment to verify that they will adequately perform as required when they are made available to a customer or end-user. For example, when a packaged consumer good, such as prepackaged contact lens, is required to contain a given amount of liquid in a leakproof fashion, such a package is typically tested to ensure a leakproof seal. Many prior art leak testing techniques exist in which sealed containers are placed in a chamber and subjected to a vacuum. Once the desired vacuum is obtained, the chamber is sealed from the atmosphere and any recorded change of pressure, within the vacuum chamber, is used to determine if the package is leaking in excess of a desired rate. The presumption is that the change in pressure is due to the container leaking its liquid contents into the chamber where the liquid is vaporized. See for example U.S. Pat. No. 5,907,093 issued to Martin Lehmann on May 25, 1999 titled, "Method For Leak Testing And Leak Testing Apparatus".

An alternate method is to determine how much mass has to be pumped from the chamber to maintain the partial vacuum level. The latter method is called "flow" rather than "vacuum decay."

Any rise in pressure, within the vacuum chamber, is indicative of vaporization of available liquids whether from a leak in the sealed container, a chamber leak, or water vapor emitted from the walls of the test chamber or other surfaces, a phenomena known as outgassing. Known state-of-the-art "pressure rise" moisture detection instruments work by this principle.

If the pressure increase, in a vacuum decay test, is relatively small, then there must have been very little liquid present in the chamber, and the part is considered satisfactory for shipment. If the pressure increase is large, it is then assumed that there must have been a significant amount of the liquid (e.g. a significant source of gas), and the product being tested is rejected for shipment. Of course, to make an accurate determination it is necessary to ensure that the pressure inside the chamber falls below the vapor pressure of the liquid in the sealed package being tested and that the pressure increase came from the liquid in the package rather than from chamber surfaces.

None of the known prior art for detecting leaks in sealed containers, having at least some liquid therein, has been effective in distinguishing between pressure increases caused by chamber leaks, or outgassing, and pressure increases resulting from vaporization of liquid drawn from a leak in the sealed container. The traditional method of simply looking for a pressure change to determine the quality of a part may lead to false rejects of good products.

In addition, if the acceptable leak rate is very small, the system may be unable to distinguish pressure changes due to package leakage, from the pressure changes resulting from the other causes described above.

SUMMARY OF THE INVENTION

Accordingly, it is an object of the present invention to provide a package leakage test method to test the integrity of sealed containers having at least one liquid component therein that is capable of differentiating between pressure increases caused by system outgassing and pressure increases caused by a leaking container.

The present invention teaches a method of detecting moisture leakage from sealed packages containing liquid, such as contact lens packages. The package to be tested is placed within a vacuum chamber and the chamber pressure is decreased to a pressure that is below the vapor pressure of the liquid contained within the package.

After a predetermined amount of time, the vacuum chamber is sealed and a leak is detected by measuring the pressure increase, as a function of time, within the chamber. The vacuum, within the chamber, will cause liquid to leak from a defective package and the vaporization of the leaking liquid will cause a pressure rise in the vacuum chamber.

However, a pressure increase can not only occur from liquid being sucked out of a leaking package and boiling off into the chamber, but also leaks in the chamber walls, door, or moisture evaporating off of the chamber walls may cause a measurable increase of pressure within the vacuum chamber.

By the present invention, chamber pressure increases from sources other than package leaks are distinguished from package leak pressure increases by analyzing the vacuum chamber pressure increase, as a function of time, as represented by a recorded pressure vs. time curve. Pressure increases caused by the system are represented by a substantially smooth curve pressure vs. time curve. However, chamber pressure increases caused by package leaks create a "rippled" or substantially "bumpy" curve. This is because bursting bubbles of the boiling liquid, escaping from the package, cause rapid and substantially instantaneous pressure increases, or bumps in the curve. A method such as the least squares method, and other linear and non-linear methods, which are well known in the art, may be employed to quantify the amount of curve ripple. By using curve ripples to detect leaks, rather than overall chamber pressure increase, the method of the present invention is capable of more accurately detecting leaks.

Accordingly, it is an object of the present invention to provide a leak test method to test the integrity of sealed packages, having at least one liquid component therein, that is capable of differentiating between chamber pressure increases caused by system outgassing, or other events not related to a leaking package, and pressure increases caused by package leakage.

BRIEF DESCRIPTION OF THE DRAWINGS

While the specification concludes with claims particularly pointing out and distinctly claiming the present invention, it is believed that the same will be better understood from the following description taken in conjunction with the accompanying drawing in which:

DETAILED DESCRIPTION OF THE PREFERRED EMBODIMENT

Figure 1:
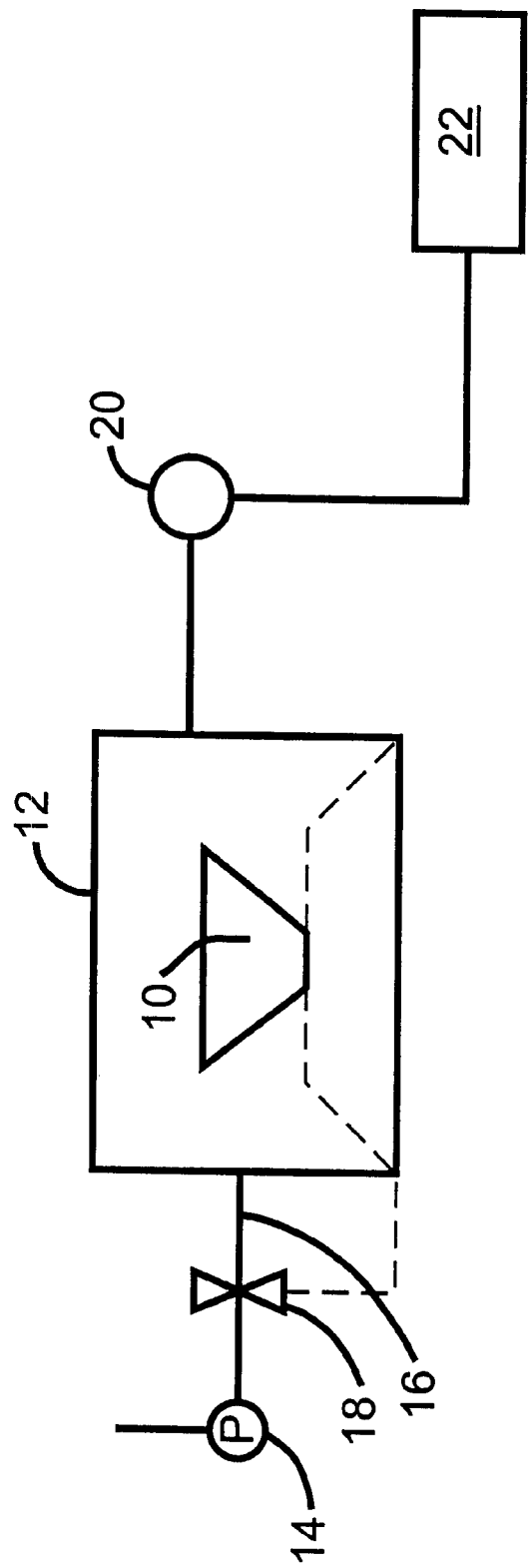
FIG. 1 presents a functional diagram illustrating the primary elements of an apparatus for practicing the present invention.

FIG. 1 schematically illustrates the typical structure and apparatus for use with the present invention. The test package 10 is placed in vacuum chamber 12. Vacuum pump 14 is fluidly connected to chamber 12 by suitable piping 16 and valve 18. Suitable pressure measuring instrumentation 20 fluidly connected to chamber 12 measures the instantaneous pressure within chamber 12 and transmits a signal to a recording and analyzing device 22 which records the vacuum chamber pressure data as a function of time and analyzes the data to determine if a package leak is present.

Any vacuum chamber that can accommodate the package to be tested and maintain a vacuum may be used. Such vacuum chambers are typically a custom design that will comfortably receive the package to be tested without having excess chamber space and allows for acceptable loading and unloading of the package or packages. Chamber materials are generally those needed to provide sufficient structural integrity and to be compatible with the fluid contained within the package. Stainless is a preferred vacuum chamber material.

Although the inventive method of the present invention has a variety of applications in most any situation where the integrity of a liquid containing package is important, the present method has great utility in the testing of pre-sealed contact lens containers. However, any container that is designed to retain a liquid and prevent leakage of the liquid from the container or prevent contamination of the liquid from the exterior environment is suitable for this type of test method. Such containers may include but not be limited to:

Perfume bottles

Medicine pouches

Contact lens containers

Vaccine containers

In operation the package 10 to be tested is placed within vacuum chamber 12 and the ambient pressure within the chamber is drawn down to a value below the vapor pressure of the liquid within the package. After a predetermined amount of time, the vacuum source 14 is removed from chamber 12 by closing valve 18 whereby the chamber containing the vacuum is "sealed off."

Figure 2:
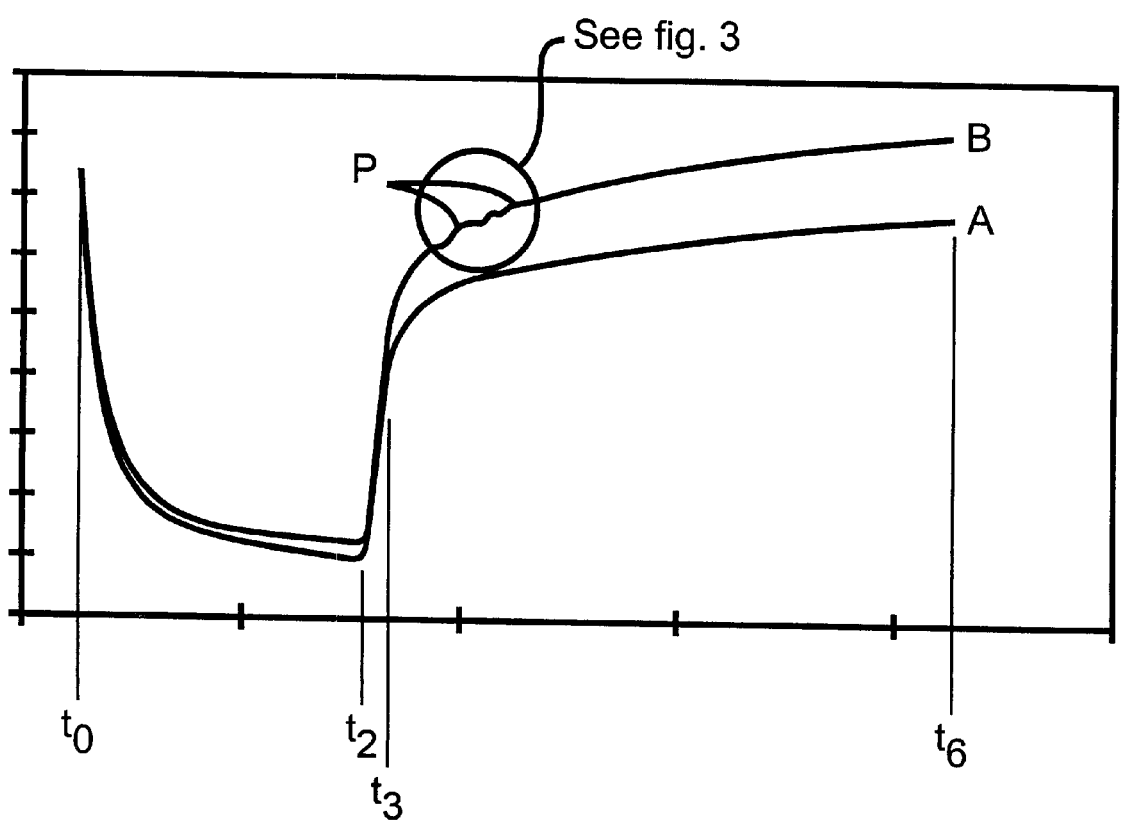
FIG. 2 presents a pressure vs. time curve for a leaking package and a non-leaking package.

The vacuum within chamber 12 causes liquid within the package to be sucked through any leak in the package, should a leak exist. Once leaking liquid has escaped through a leak and into chamber 12, the liquid will boil (as long as the pressure inside the chamber remains below the vapor pressure of the liquid). This boiling, which occurs much like boiling a pan of water on a stove, generates large amounts of gas, causing the pressure inside chamber 12 to increase until such time that the pressure inside the chamber is greater than the vapor pressure of the liquid within the package, at which time the boiling stops. The boiling of the escaped liquid causes one or more rapid increases in chamber pressure. Such pressure increases occur in bursts corresponding to the bursting of boiling bubbles of the escaped liquid. The liquid may boil in a similar fashion without escaping from the package and create a similar effect. This rapid and sudden vaporization of leaked liquid causes a corresponding ripple, or bump, in the otherwise smooth pressure vs. time curve as illustrated in FIG. 2. FIG. 2 presents pressure vs. time profiles for both a non-leaking package, curve A, and a leaking package, curve B.

The vacuum test begins at time t0 when vacuum pump 14 begins to withdraw air from the test chamber 12. The vacuum chamber pressure is seen to drop rapidly and begin to level off until vacuum pump 14 is turned off and valve 18 closed thereby sealing chamber 12 from pump 14 and the ambient environment at time t2. Immediately after sealing vacuum chamber 12, the chamber pressure is seen to rise rapidly from t2 to t3 and then to continue its rise at a much more shallow trend as it approaches time t6.

Figure 3:
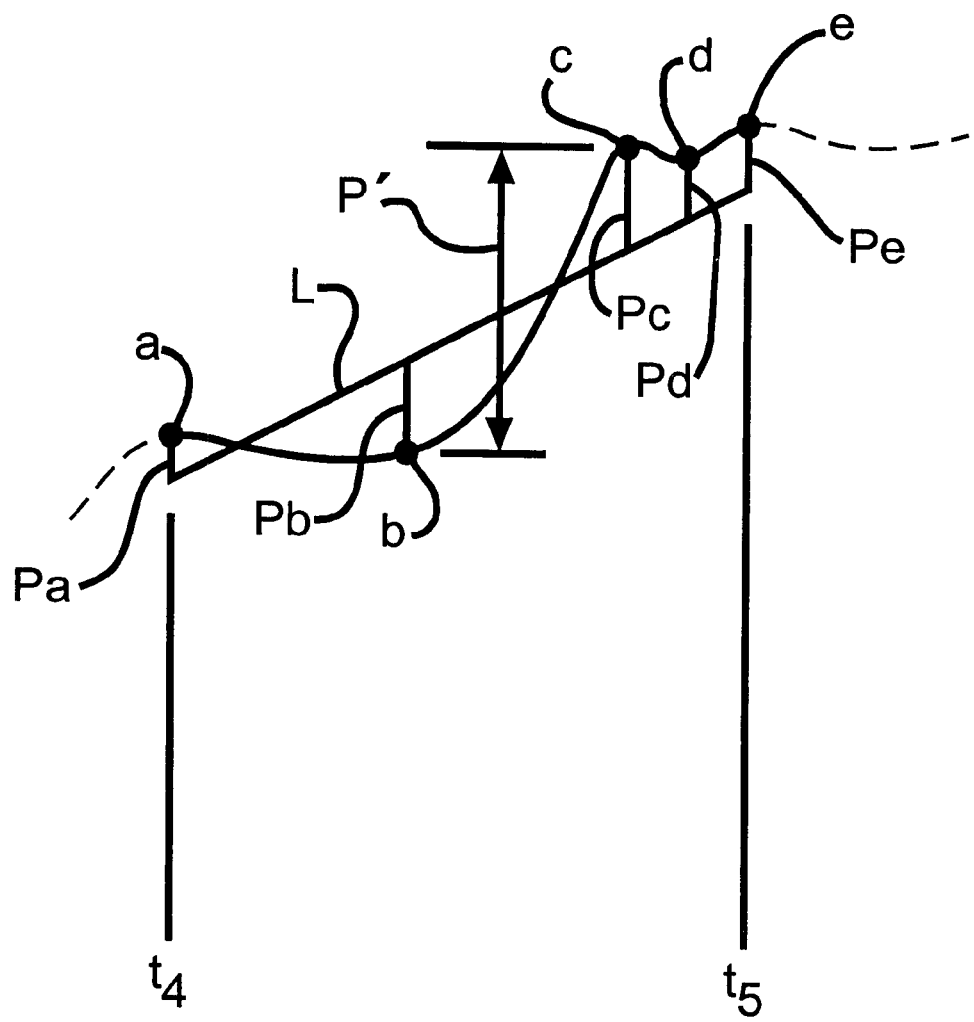
FIG. 3 presents the circled portion of FIG. 2 showing that portion enlarged for purposes of describing the present invention.

It is to be noted that curve A, for a non-leaking package, exhibits a "smooth" rise over time as it approaches time t6. However curve B exhibits an irregular rise as it approaches time t6. FIG. 3 presents an enlarged portion of the circled portion of curve B where the time interval t5–t6 equals approximately 0.5 seconds.

Figure 4:
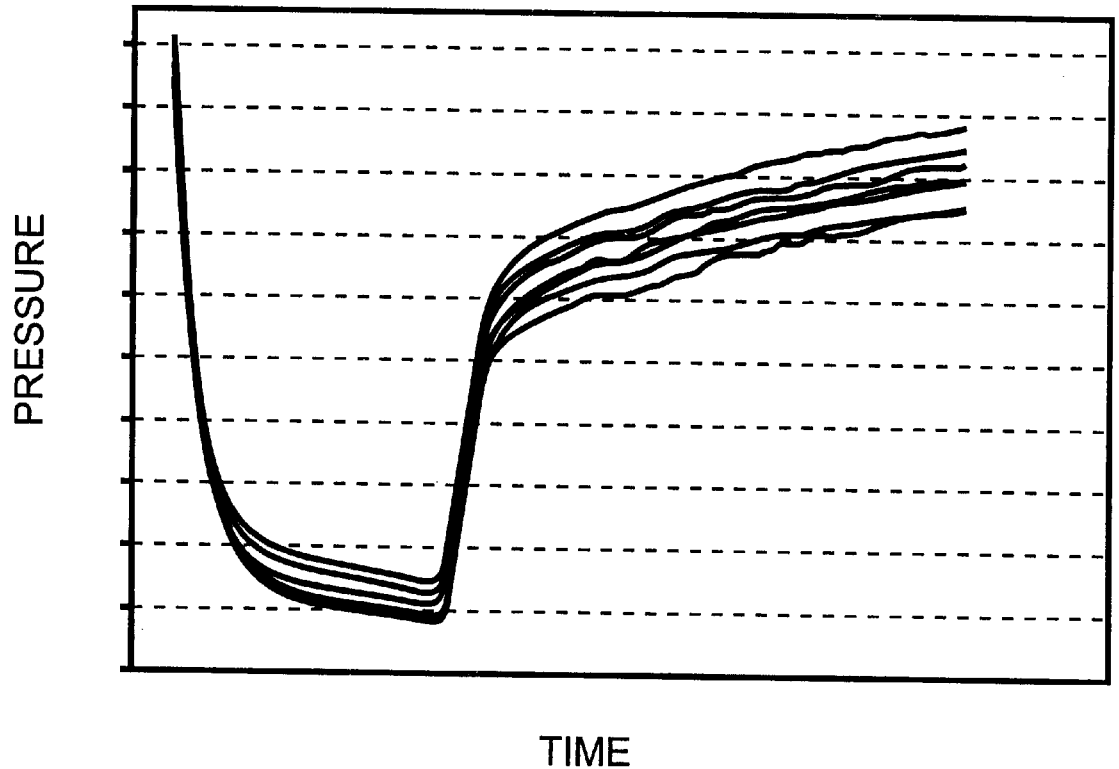
FIG. 4 presents pressure vs. time curves for a multiple number of leaking packages.

FIG. 4 presents the chamber pressure vs. time profile for seven contact lens packages having various degrees of leakage, the higher the curve, the greater the leaks from the package.

To identify and measure the amount of "ripple" within the pressure vs. time curve, a series of straight line approximations are fit to successive time intervals (approximately 0.5 seconds) of the curve. A method such as the least squares method, or any other linear or non-linear method, which is well known in the art, may be employed to quantify the amount of curve ripple.

Referring now to FIG. 3, line L represents the best straight line fit for data points a, b, c, d, and e, over the time interval t4–t5 which is approximately 0.5 seconds. Lines pa. pb, pc, and pe represent the deviation of pressure for data points a, b, c, d, and e, from line L for times ta tb, tc, td, and te respectively. A representative peak to peak, "bump height" p1 is calculated for the selected time interval t4–t5 by determining the greatest peak to peak pressure deviation. For the example illustrated in FIG. 3, the representative "bump height" for the illustrated time interval, would be determined by adding the absolute value pb and pc.

A representative "bump height" is calculated for each successive time interval and the arithmetic mean, or average, is then calculated for the total number of time intervals evaluated. The mean "bump height," for all time intervals is then compared to a control value to either accept the tested package or reject the package.

The implementation of peak-to-peak (range) analysis to quantify the linearized bump could also be performed differently. Statistical methods like standard deviation analysis might be particularly attractive, though more computationally intense. A multitude of techniques exist. The implementation of 0.5 second overlapping sample segments is similarly modifiable. It is also apparent to those knowledgeable in the art that auto-correlation of the time slices and other spatial or frequency analysis methods would provide similar information without necessarily requiring data segmentation of curve fitting techniques.

The preferred implementation of the present inventive method uses Least Squares analysis to derive the best fit straight line, but other curve fitting methods (including nonlinear methods) could be used as well. Polynomial and exponential nonlinear models were evaluated as were two other linear methods. One particular polynomial model that was evaluated worked slightly worse and was computationally more complex than the standard linear method.

The primary purpose of product testing of pre-filled containers, such as contact lens packages, is, of course, to distinguish the good packages from the bad packages. Using the method of the present invention, it becomes possible to detect leaks three times smaller than detectable leaks using pressure rise information alone.

| | X<br>Mean value<br>of leak<br>free parts | S<br>Standard<br>deviation of<br>leak free parts | Multiples of S<br>to nearest<br>leaking part. |
|---|---|---|---|
| Linear method to measure ripple | .0003171 | .0000427 | 10.6 |
| Polynomial method to measure ripple | .001192 | .00018 | 7.9 |
| Standard pressure rise method | 2.051624 | .001737 | 3.23 |

Using the data set in the above table, the "Standard" entry represents the results of analysis using current state-of-the-art technology. The value "3.23" indicates that there is very little difference between the worst "good" part and the best "leaky or bad" part. (Note: S=Standard deviation of the samples.) Larger values of "S", indicates an improved ability to distinguish between good and bad parts.

Thus by the above statistical analysis, the linear approximation method as taught herein above is the preferred method of identifying defective packages.

Having shown and described the preferred embodiments of the present invention, further adaptation of the method taught herein for leak detection can be accomplished by appropriate modifications by one of ordinary skill in the art without departing from the scope of the present invention. A number of alternatives and modifications have been described herein and others will be apparent to those skilled in the art. Accordingly, the scope of the present invention should be considered in terms of the following claims and is understood not to be limited to the details of the structures and methods shown and described in the specification and drawings.

What is claimed is:

1. A method for leak testing at least one closed container, whereby the contents of said container comprise at least one liquid component, comprising the steps of:
   a) placing said container in a vacuum chamber;
   b) sealing said vacuum chamber;
   c) applying a vacuum to said vacuum chamber and lowering the pressure within said chamber to a pressure that is below the vapor pressure of said at least one liquid component, by means of a pumping arrangement thereby causing some of said liquid within said closed container to be drawn out of said closed container when a leak is present in said at least one closed container;
   d) removing said vacuum source by isolating said pumping arrangement;
   e) determining whether a leak is present in said at least one closed container by monitoring the increase of pressure in said vacuum chamber as a leak indicative signal wherein a relatively steady increase in pressure over time is indicative of system outgassing and wherein oscillatory perturbations in the pressure versus time curve is indicative of boiling liquid and therefore a leak in at least one closed container.

2. A method of testing a sealed package having a liquid component therein for a leaking seal comprising the steps of:
   a) providing a vacuum chamber,
   b) placing said package inside said vacuum chamber and sealing said chamber,
   c) lowering the ambient pressure within said vacuum chamber to a pressure below the vapor pressure of said liquid,
   d) measure and record the pressure within said vacuum chamber as a function of time,
   e) divide said pressure measurements into predetermined time intervals,
   f) for each time interval, calculate a straight line approximation for the recorded pressure data as a function of time,
   g) for each time interval determine the greatest positive and negative deviation between the measured pressure and the straight line approximation,
   h) for each time interval, calculate the maximum peak to peak value by adding the absolute values of said greatest positive and negative pressure deviations calculated in step (g),
   i) calculate the arithmetic average peak to peak value for all time intervals,
   j) compare said average peak to peak value with a control value.

3. The method as claimed in claim 2 wherein said straight line approximation of step (f) is performed by the method of "least squares."

4. The method as claimed in claim 2 wherein said straight line approximation of step (f) is performed by a nonlinear method.

* * * * *